US008366551B2

(12) United States Patent
Thomas

(10) Patent No.: US 8,366,551 B2
(45) Date of Patent: Feb. 5, 2013

(54) SINGLE PLAYER FANTASY SPORTS GAME

(75) Inventor: Jeffrey Thomas, Kenosha, WI (US)

(73) Assignee: World Sports Technology, Inc., Kenosha, WI (US)

( * ) Notice: Subject to any disclaimer, the term of this patent is extended or adjusted under 35 U.S.C. 154(b) by 617 days.

(21) Appl. No.: 12/435,695

(22) Filed: May 5, 2009

(65) Prior Publication Data

US 2010/0285856 A1  Nov. 11, 2010

(51) Int. Cl.
  *A63F 9/24*  (2006.01)
(52) U.S. Cl. .......................................... 463/42
(58) Field of Classification Search ................. None
  See application file for complete search history.

(56) References Cited

U.S. PATENT DOCUMENTS

| | | | |
|---|---|---|---|
| 4,918,603 A | 4/1990 | Hughes et al. |
| 5,018,736 A | 5/1991 | Pearson et al. |
| 5,263,723 A | 11/1993 | Pearson et al. |
| 5,846,132 A | 12/1998 | Junkin |
| 5,860,862 A | 1/1999 | Junkin |
| 5,971,854 A | 10/1999 | Pearson et al. |
| 6,193,610 B1 | 2/2001 | Junkin |
| 7,001,279 B1 | 2/2006 | Barber et al. |
| 7,548,242 B1 | 6/2009 | Hughes |
| 7,614,944 B1 | 11/2009 | Hughes |
| 2003/0054885 A1 | 3/2003 | Pinto et al. |
| 2005/0164792 A1 | 7/2005 | Wilcock |
| 2005/0239549 A1 | 10/2005 | Salvatore et al. |
| 2006/0040719 A1 | 2/2006 | Plimi |
| 2008/0039210 A1 | 2/2008 | Junkin |
| 2008/0287198 A1* | 11/2008 | Callery et al. ............. 463/42 |
| 2009/0270172 A1* | 10/2009 | Sorrells et al. ............ 463/42 |

FOREIGN PATENT DOCUMENTS

| | | |
|---|---|---|
| AU | 636411 | 4/1993 |
| CA | 2044266 | 11/1996 |

* cited by examiner

*Primary Examiner* — David E Graybill
(74) *Attorney, Agent, or Firm* — Nicholas A. Kees; Godfrey & Kahn, S.C.

(57) ABSTRACT

A single user fantasy game, including a database of VFGMs, each having strategies and player rankings supplied by or for certain human remote GMs, together with a database of real-world athlete/participants. A draft is launched, with the user and at least selected VFGMs as participants. In that draft, the user and the VFGMs make selections of athlete/participants according to predetermined draft rules. Those selections made by the user and by the VFGMs are then saved as respective teams in a team database. Once the teams are selected, the performance of the teams is determined, using a database of real-world performances/statistics, for the athlete/participants in the database of athlete/participants, from a particular time period and according to a set of fantasy game scoring rules. A winner is determined from among the user and the VFGMs, based on the performance of the teams for the particular time period.

13 Claims, 1 Drawing Sheet

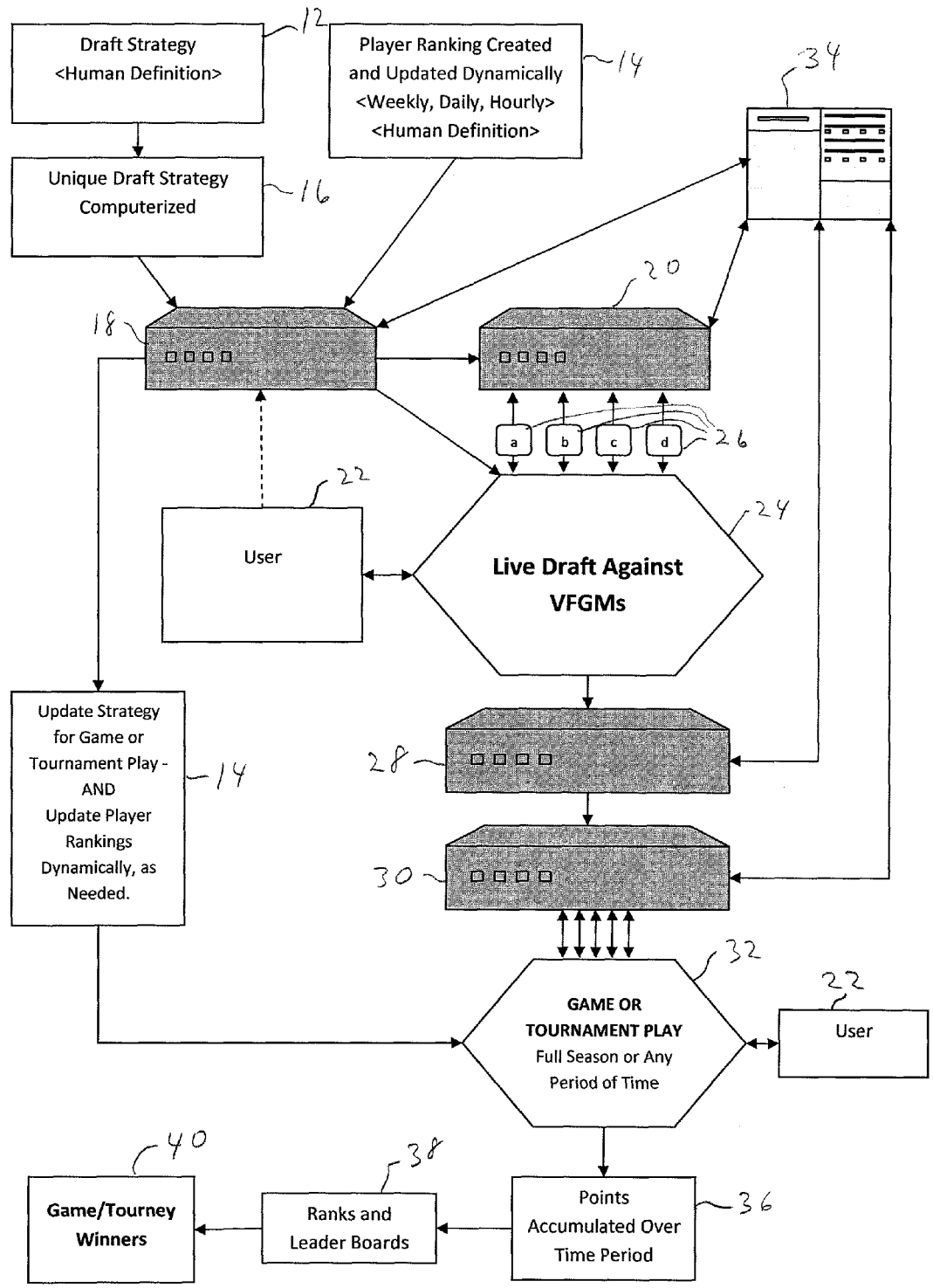

SINGLE PLAYER FANTASY SPORTS GAME

BACKGROUND OF THE INVENTION

This invention relates to games or tournaments based on sports, television shows or other real world events, and specifically to fantasy games wherein the user/fantasy player selects real-world athletes, actors, topics, industries or event participants and, according to certain rules and point systems, compare the performance of their fantasy teams based on real-life results.

To win a fantasy game, a user will do the best job of predicting future performance and drafting or managing his or her team based on those predictions. Fantasy leagues are known to fans of major sports and other events. Included are fans of professional football, professional basketball, professional hockey, major league baseball, auto racing, television shows such as American Idol, and industries such as movies and fashion. Typically in the prior art, a "draft-style" league is created having a plurality of participating team general managers. The managers gather, either in a physical location or online, at a previously agreed date and time before the start of the corresponding season, show or event, to draft "players" (hereinafter referred to as "athlete/participants") for their fantasy teams. The rules can vary from fantasy league to fantasy league, but in general, each participating team general manager is permitted to draft a certain number of athlete/participants to create a roster. For example, a typical fantasy football team roster might have two quarterbacks, six running backs, six receivers, two kickers, two defenses and two special teams. As another example, typical American Idol league teams would involve selecting a roster that would include the top finishers in the American Idol competition from among the Hollywood finalists.

Often, however, such gatherings can be difficult to schedule, as the schedules of eight, ten or twelve users to participate in such a draft can be difficult to coordinate, and it can be difficult to find a suitable time to conduct a draft when all the users who are team general managers are available. In order to combat this scheduling problem, sometimes fantasy leagues have the users create a list of players before the draft so that, if a particular user is not able to attend the draft, at least that user will be able to receive some picks, based on the list that user determined before the draft.

Many such users or team general managers consider the draft the most fun part of fantasy sports, as the most challenging part of the game can be selecting the players to be on the roster. Often, users get discouraged if they are randomly assigned a draft position they consider disadvantageous. Often, such leagues end early because many of the users quit or lose interest, leaving the league with limited competition and ruining the experience for others in the league. The use of a predetermined list, the assignment of an unfavorable draft position, or the loss of users during the game, as described above, can substantially reduce the fun of the game or tournament.

This invention relates to improvements to fantasy leagues to make them more interesting, and to solutions to some of the problems raised or not solved by conventional fantasy leagues.

SUMMARY OF THE INVENTION

The invention provides for a single user fantasy game, wherein a user competes against either a preset group of virtual fantasy general managers (hereinafter referred to as VFGMs) or selects from a variety of possible VFGMs. In the first step, then, a database of VFGMs is compiled for or by certain human fantasy general managers. Also, a database of real-world athlete/participants is provided. Once the league of teams is thus constituted, a draft is run, with the user and the VFGMs participating in the draft. In that draft, the user and the VFGMs make selections of fantasy athlete/participants according to predetermined draft rules. Those selections of fantasy athlete/participants made by the user and by the VFGMs are then saved or stored as respective teams in a team database. Once the teams are thus constituted and the event has occurred, the relative performance (or score) of the teams is determined, using a database of real-world results and statistics, for the athlete/participants in the database of real-world athlete/participants, from a particular time period or event and according to a set of fantasy game scoring rules. From there, a winner is determined from among the user and the participating VFGMs, based on the performance of the teams for the particular time period or event. In a game or tournament, the overall performance of each user is compared against all other users to determine the winner(s).

Other objects and advantages of the invention will become apparent hereinafter.

BRIEF DESCRIPTION OF THE DRAWINGS

The drawing FIGURE is a schematic diagram showing the process steps and structure for a preferred embodiment of the invention.

DETAILED DESCRIPTION OF THE INVENTION

As shown in the drawing FIGURE, the invention provides for a method for permitting the playing of a fantasy game by a single user. As used herein, the concept of "single user" can be taken to include more than one physical individual person, and could therefore include a group of people acting generally as a single entity, making decisions about a single team within a fantasy league.

The method begins with the provision of a database 18 of profiles, that is, VFGMs, compiled with information supplied by certain human fantasy general managers, or remote GMs. In a preferred embodiment the VFGMs are compiled with information supplied by remote GMs such as experienced and well-known fantasy professionals, experts in the field, and against whom the best fantasy users would want to be measured. In another embodiment, the VFGMs are compiled with information supplied by remote GMs such as celebrities, against whom certain interested fantasy users would want to be measured. And in other embodiments the VFGMs could be compiled with information supplied by remote GMs such as regular people, simply anyone who would want to participate as a remote GM.

In any of those embodiments, each VFGM constitutes a unique and complete profile, including a proprietary, subjective draft strategy 12, and a fantasy athlete/participant draft ranking or list 14.

For each VFGM, the draft strategy 12 is an expression of the way that the particular human remote GM thinks, while he or she is participating in a fantasy draft. That human-based strategy is then converted into a computerized strategy 16, which is stored as part of the VFGM in the VFGM database 18. This draft strategy 12 is expressed in terms of certain drafting rules decided upon by the human remote GM. Just a few examples are: how soon a certain position or player is drafted, how many position players are drafted by a certain round, how many players are drafted at each position, how long to wait to draft a certain position, and so on. In those leagues based upon seasons or multiple events rather than single games or events, each VFGM strategy is also expressed in terms of certain "managing rules," which govern such parameters as: how to select a participating or starting roster from the overall roster, from one game to the next; how to draft or not draft free agents; how to manage a waiver or free agent selection process; how much risk to take when adding or dropping players, and so on.

The draft rankings or athlete lists 14 are preferably updated often and regularly by the human remote GM, as often as weekly, daily, even hourly, based upon subjective analysis, breaking athlete news, and research done by the human remote GM. This draft ranking 14 is an important factor in the uniqueness of the game/competition in that each set of lists of athlete/participants may be unique, and they are as dynamic as the human remote GM is dynamic, because of the fact that they may be updated on a minute-by-minute, hourly, daily, weekly, or monthly basis to ensure that the user is competing against skilled and timely competitors.

Each human remote GM thus creates the VFGM, including the strategy and the draft ranking as described. The VFGM also includes a certain amount of randomness so that, similar to real-life game play, the drafts participated in and other decisions made by any particular VFGM need not always result in the same choices being made under the same circumstances. All of these VFGMs are stored in the VFGM database 18 on a computer, and made available to users who want to play this novel fantasy sports game. Human competition is thus emulated for the single user, both during the draft and during the game or tournament.

Also provided is an athlete/participant database 20, stored on a computer and available to users, of real-world athlete/participants in the games or events of interest to the users. So, for instance, in a fantasy game based on the National Football League, the database of athlete/participants would be comprised of all football players currently on the roster of a National Football League team. Generally, for a football fantasy game, the athlete/participants included in the database could also include non-individual entities, such as the defense of each National Football League team and the collective special teams of each National Football League team. For most other sports, such as Major League Baseball, the National Basketball Association or the National Hockey League, the database of player athletes would be comprised of all current players on rosters of teams in those sports. And for other types of events, the database of athlete/participants would include the respective participants in those events, such as the singers for American Idol, or the Oscar nominees for a fantasy game based on the Academy Awards.

The game begins with a user 22, which corresponds to a human team owner/manager in a conventional fantasy league, preparing to draft against the VFGMs. The user 22 can be thought of as entering a virtual draft room 24, while not necessarily physically moving anywhere.

In one embodiment, thousands of users compete, one at a time, against a set group of VFGMs. This creates a level playing field, challenging each user to out-perform the others against the same competition and using the same rules and scoring system. This embodiment allows the size of the league, game, or tournament to be almost unlimited. No longer will a game or tournament be limited by the personal schedules of many users or the challenges of logistics and timing.

In another embodiment, as an option, the user 22 may select those VFGMs from the VFGM database 18 against which the user would like to compete. In that embodiment, the number of VFGMs to be selected from the VFGM database 18 is determined by the basic rules of the particular fantasy league. Often, in conventional fantasy league drafts, one limit on the size of the league is the difficulty of getting a large group of people together at one particular time to conduct a draft. Issues such as this often limit the league size to eight, or possibly ten, owner/managers. With the present invention, in the embodiment described, that issue is removed entirely, and so the league could be much larger, possibly 16 teams, 24 teams, 32 teams, or more. The size of the league is no longer limited by the schedules of more than one actual user or owner/manager.

Once the VFGMs against which the user wants to compete are determined, whether by the user or by any other means, a draft is then launched, at the user's convenience, with the user and the VFGMs as participants, each being the owner/manager of a single team in the league. In this draft, similar to conventional fantasy leagues, the user and the VFGMs each make selections of fantasy athlete/participants from the athlete/participant database 20, according to predetermined draft rules. That is, a draft order is determined, either randomly or by rules permitting the user to select a certain draft position, and optionally even selecting the entire draft order. And as in conventional fantasy drafts, the draft order can be the same in every round, or it can be reversed in alternate rounds. In this game, the draft order could even be randomized in the first round, and could also be randomized differently in every round. Other users 26 could be doing the same thing at the same time, instituting their own leagues against a group of VFGMs that may be the same as the user 22 is facing, or could be different than the group of VFGMs against which the first user 22 is selecting and competing.

As the selections of fantasy athlete/participants are made by the user 22 and by the VFGMs, those selections are saved or stored as respective teams in a team database 28, which is stored on a computer and available to the user. The user 22 thus has become one of the owner/managers with a team in that league, and the VFGMs have constituted the rest of the owner/managers of the teams in that league.

Once the teams, and thus the league, are composed and assembled in the manner described above, the league can be run in one of several ways. In one embodiment, a database 30 of real-world performances/statistics is used, for those athlete/participants in the database of real-world athlete/participants, that are included in the teams as selected by the user 22 and the VFGMs. A particular time period or event and a set of fantasy game scoring rules for determining the performance of the teams is determined. Then, based on the real world performance/statistics in the database 30, of the real world athlete/participants in the database 28, games are "played" or events occur 32. A server or computer 34 is in communication with the databases 18, 20, 28 and 30 and programmed with predetermined draft rules and fantasy scoring rules. The computer 34, thus programmed, uses the predetermined draft rules, the selected VFGMs, the athlete/participant database and input from the user to determine the makeup of the teams in the team database. The programmed computer 34 uses the fantasy scoring rules, the performances/statistics database and the team database to determine the performance of the respective teams. Points are accumulated 36 for the users and the VFGMs, winners of particular "games" or "events" from among the user and the selected VFGMs are determined 38 for that particular time, game or event, and the overall winners of the league can thus be determined 40.

Example 1

This example is a multi-week fantasy football league based upon the National Football League and the future statistics of its players. First, the VFGM database is formed by the human remote GMs. Besides the athlete/participant draft rankings or lists, the remote human GMs provide their strategies. One example strategy follows:

DRAFT RULES

| Position | Number | Instruction | Draft Round |
|----------|--------|-------------|-------------|
| QB | 1 | Don't draft before | 3 |
| RB | 1 | Draft by | 3 |
| WR | 1 | Draft by | 3 |
| RB | 2 | Draft by | 5 |
| WR | 2 | Don't draft before | 4 |
| RB | 3 | Draft by | 9 |
| WR | 3 | Draft by | 8 |
| QB | 2 | Don't draft before | 7 |
| TE | 1 | Don't draft before | 6 |
| K | 1 | Don't draft before | 12 |
| D/ST | 1 | Don't draft before | 10 |

ROSTER COMPOSITION

| Position | Minimum | Maximum |
|----------|---------|---------|
| QB | 2 | Max. allowed by League |
| RB | 4 | Max. allowed by League |
| WR | 4 | Max. allowed by League |
| TE | 1 | Max. allowed by League |
| K | 1 | 2 |
| DST | 1 | 2 |

BYE WEEKS

| Position | Bye Week Tolerance (1-4) |
|----------|--------------------------|
| QB | 2 |
| RB | 4 |
| WR | 3 |
| TE | 1 |
| K | 1 |
| DST | 1 |

Tolerance Key:
1 - No players drafted at that position can have the same bye
2 - Consecutive players drafted at that position can't have the same bye
3 - Consecutive players drafted at that position can't share same bye unless 2nd player is ranked at least 7 spots higher than next player at that position
4 - Any player at that position can share same bye If a Top 4 QB is available in Round 4, take him.
If taking a QB in the first three rounds, don't take another QB before 8th round.
If no top 5 TE available at ranking, do not draft a TE before all starting QB, RB and WR spots are filled.
First round
If picking in top 5, pick top RB available.
If picking lower than 5 and no top 7 RB available, take the best available player.
Second round
If no RB taken in first round, take RB.
If RB taken in the first round, take RB if one in top 10 is available.
Otherwise, take a top 4 WR if available.
Otherwise, take top 3 QB Using the database of VFGMs as described above, the user faces 11 VFGMs, to form a 12 team league. After that league is formed, at a convenient time determined by the user, the draft is launched. For purposes of this example, the user decides to draft in the Number 3 position, and the other 11 draft positions are filled randomly by the VFGMs. In this example, the draft rules provide for a "serpentine" draft, that is, that the draft order is reversed in alternating rounds. Once the user launches the draft, the VFGMs preceding the user in draft order make their picks sequentially, and the user's turn to pick comes up. The user then makes his selection from the available athlete/participants in the athlete/participant database, and the rest of the VFGMs make their selections for the first round. The rest of the rounds are similarly completed, again with the draft order being reversed in each round. Each team's roster will consist of twenty (20) players and defenses/special teams. Detailed roster requirements for this example are:

| | |
|---|---|
| Quarterback Requirements | 1 min/3 max |
| Running Back Requirements | 4 min/8 max |
| Wide Receiver Requirements | 4 min/8 max |
| Tight End Requirements | 1 min/3 max |
| Placekicker Requirements | 1 min/3 max |
| Defense/Special Teams Requirements | 1 min/3 max |
| Allow Duplicate Players | No |
| Total Players on Roster | 20 |

A Starting Team must consist of 9 Players and 1 Defense/Special Team:
One Quarterback
Two Running Backs
Three Wide Receivers
One Tight End
One Flex position (RB, WR, or TE)
One Placekicker
One Defense/Special Team
Players are only eligible at a specific position identified for them. Player positions do not change during the duration of the game.

The scoring rules for this example are as follows:
Passing
  TD=3 points
  Every 10 yards=0.5 point
  2 point conversion=1 point
Rushing/Receiving
  TD=6 points
  Every 5 yards=0.5 points
  2 point conversion=2 points
  Each reception=1 point
Kicking
  FG 50+ yards=9 points
  FG 40+ yards=6 points
  FG 0-39 yards=3 points
  PAT=1 point
Defense/Special Teams
  Zero Points Scored Against, a "Defensive Shutout"=10 points
  2 to 6 Points Scored Against=7 points
  7 to 13 Points Scored Against=4 points
  14 to 17 Points Scored Against=1 point
  Defense TD=6 points
  Kick/Punt Return TD=6 points
  Fumble recovery=2 points
  Interception=2 points
  Safety=2 points
  Sack=1 point A user competes head-to-head once against each VFGM, one week at a time during an 11 week season, and accumulates total points based on this scoring system. The VFGMs will also be scored against each other, week by week, with each VFGM facing each other VFGM exactly once during the first 11 weeks of the contest regular season, for entertainment and ranking purposes. Each winning team, based on total points for the week, will be awarded one win. Each losing team, based on total points for the week, will be assessed one loss. If a game between two teams in the league results in a tie in total points for that game, one tie will be awarded for each of the two teams for that game. Based on the respective Win-Loss-Tie records, the teams will be ranked each week in a set of standings. Any ties in standings will be broken by Total Points. The team with the best overall record after 11 weeks will be considered the "League Winner."

If a user is tied for first place in the league with the highest scoring VFGM after the 11 week regular season (equal Win-Loss-Tie record and exact Total Points), the user will be named the League Winner.

Example 2

This example is a single-week fantasy football league based upon the National Football League and the future statistics of its players. Using the database of VFGMs described above, a user competes against nine of those VFGMs, to form a 10 team league. As soon as the user sets up a team, the draft is launched immediately. For purposes of this example, the user decides to draft in the Number 3 position, and the other nine draft positions are filled randomly by the nine set VFGMs. In this example, the draft rules provide for a "straight-line" draft, that is, a draft wherein the draft order is the same in each round. Once the user launches the draft, the VFGMs preceding the user in draft order make their picks sequentially, and the user's turn to pick comes up. The user then makes his selection from the available athlete/participants in the athlete/participant database, and the rest of the VFGMs make their selections for the first round. The rest of the rounds are similarly completed, again in the same order in each round. Each team's roster will consist of nine players, plus one defense and one special team. Since this is a single week tournament, the entire roster will be the starting lineup. Detailed roster requirements for this example are:
- One Quarterback
- Two Running Backs
- Three Wide Receivers
- One Tight End
- One Flex position (RB, WR, or TE)
- One Placekicker
- One Defense
- One Special Team
- Players are only eligible at a specific position identified for them.

The scoring rules for this example are as follows:
Head-to-Head Matchups
  Win=5 points
Passing
  TD=3 points
  Every 10 yards=0.5 point
  2 point conversion=1 point
  Bonus=3 pts for TD of 40+ yards
Rushing/Receiving
  TD=6 points
  Every 5 yards=0.5 points
  2 point conversion=2 points
  Each reception=1 point
  Bonus=3 pts for TD of 40+ yards
Kicking
  FG 50+ yards=9 points
  FG 40+ yards=6 points
  FG 0-39 yards=3 points
  PAT=1 point
Defense/Special Teams
  Zero Points Scored Against, a "Defensive Shutout"=10 points
  2 to 6 Points Scored Against=7 points
  7 to 13 Points Scored Against=4 points
  14 to 17 Points Scored Against=1 point
  Defense TD=6 points
  Kick/Punt Return TD=6 points
  Fumble recovery=2 points
  Interception=2 points
  Safety=2 points
  Sack=1 point
  Bonus=3 pts for TD of 40+ yards A user accumulates total points based on this scoring system, and thereby competes once against each of the other nine VFGMs during the week, the user's selected team being scored against all of the teams selected by the other nine VFGMs. The VFGMs will also be scored against each other, to arrive at a ranking of the user's team against the teams of the VFGMs.

In this game, the real competition is among all the users, measured against other users who had competed in their own single user leagues, but against the same nine set VFGMs. The total number of users could be dozens, hundreds, thousands, each in his own league, competing in that league against the same nine VFGMs, and thereby earning points. The point total scored by the user is compared to the points scored by the other users and a winner declared, or a ranking maintained. Alternatively, the particular ranking achieved by a user within his own league, in a particular week against those nine VFGMs, is assigned a predetermined number of points. The element of competition among individuals would thereby be retained and enhanced as was not possible before the present invention.

Example 3

This example is a particularly challenging single-week fantasy football league based upon the National Football League and the future statistics of its players. Using the database of VFGMs described above, a user selects 31 of those VFGMs, to form a 32 team league. After that league is formed, at a time convenient for the user, within limits, the draft may be launched. For purposes of this example, the user is randomly assigned to draft in the Number 18 position, and the other 31 draft positions are filled randomly by the VFGMs the user had selected. In this example, the draft rules provide for a serpentine draft. Once the user launches the draft, the VFGMs preceding the user in draft order make their picks sequentially, and the user's turn to pick comes up. The user then makes his selection from the available athlete/participants in the athlete/participant database, and the rest of the VFGMs make their selections for the first round. The rest of the rounds are similarly completed, reversing the order in each round. Each team's roster will consist of nine players, plus one defense and one special team. Since this is a single week tournament, the entire roster will be the starting lineup. Roster requirements and scoring rules for this example are the same as for Example 2.

A user accumulates total points based on this scoring system, and thereby competes once against all of the other 31 VFGMs during the week, the user's selected team being scored against all of the teams selected by the other 31

VFGMs. The VFGMs will also be scored against each other, to arrive at a ranking of the user's team against the teams of the VFGMs.

By following this example, the user could participate in a new draft every week of a National Football League season, and have a new team with which to compete, and even have different VFGMs against which to compete.

Example 4

This example is a fantasy league based upon the real-world American Idol television series. Once the auditions are gone through, the American Idol series itself normally selects some number, such as 12, of the contestants to become finalists, and to compete to eventually win the contest. For this example, then, the real-life event is this American Idol competition. The athlete/participants in the database of real-world athlete/participants are the American Idol finalists. In this example, three VFGMs are created by human remote general managers who are celebrities. According to the invention, the human remote GMs create the strategies and the athlete/participant draft rankings, so as to thereby create the three VFGMs. A user then selects draft position 2, and the three VFGMs are randomly assigned the other three draft spots. A straight line draft is then run. The user thus competes against this set of three VFGMs by drafting the American Idol competitors that the user considers to have the best chance of finishing highest in the competition. Other users, whether dozens or even hundreds of users, also compete in their own leagues against the same set of three VFGMs. Once the real-life American Idol competition is complete, the user is scored against the three set VFGMs, to receive a score. That score is then compared to the scores of other users, and a winner or ranking declared.

The invention also includes other variations. For instance, while it is most common practice to run a draft where the particular time period where the information is derived about the performances of the athlete/participants occurs after the draft is run, the time period could have occurred before the draft is run, such as in an instance where the participants are not aware of the particular performances, or in the alternative, different time periods could be made available, and a particular time period (e.g., Week 7 of the 1963 NFL season) could be selected by the user after the draft. Similarly, it would be most common practice to determine the fantasy game scoring rules before the draft is run. All of this flexibility is available because of this invention, and the resulting nature of not having to assemble people at particular times to run a draft, meaning that drafts can be run many times over under different scenarios.

While the apparatus described above is effectively adapted to fulfill its intended objectives as set forth, it is to be understood that the invention is not intended to be limited to the specific preferred embodiments of synchronized crystal oscillator module as described in this description. Rather, it is to be taken as including all reasonable equivalents to the subject matter of the claims as set out below.

The invention claimed is:

1. A method for providing a single user fantasy game for a user, the method comprising:
   providing a computer database of VFGMs, each VFGM comprising a draft strategy, the strategy determined by one or more human remote general managers who are not the user;
   providing a computer database of real-world athlete/participants on a computer accessible to the user;
   running a draft with the user and at least selected ones of the VFGMs participating, wherein the user and the selected VFGMs make selections of fantasy athlete/participants from the database of real world fantasy athlete/participants, according to predetermined draft rules, with a computer automatically making the VFGM draft selection decisions according to the strategies that constitute the selected VFGMs;
   saving the selections of fantasy athlete/participants made by the user and by the VFGMs, as respective teams in a team database on a computer accessible to the user;
   using a database of real-world performances/statistics stored on a computer, for the athlete/participants in the database of real-world athlete/participants, from a particular time period, and using a set of fantasy game scoring rules, using the computer to calculate and determine the performance of the teams; and
   determining a winner from among the user and the selected VFGMs based on the relative performance of the teams for the particular time period.

2. A method as recited in claim 1 further comprising permitting a user to select VFGMs against which to compete, from the database of VFGMs.

3. A method as recited in claim 1 wherein the particular time period occurs after the draft is run.

4. A method as recited in claim 3 wherein the fantasy game scoring rules are determined before the draft is run.

5. A method for providing a single user fantasy game for a user, the method comprising:
   providing a database of VFGMs, each VFGM comprising a draft strategy stored and accessed on a computer and determined by one or more human remote general managers who are not the user;
   running a draft with the user and selected VFGMs as participants, wherein the user and the selected VFGMs make selections of fantasy athlete/participants from a database of real-world athlete/participants, according to predetermined draft rules, with a computer automatically making the VFGM draft selection decisions according to the strategies that constitute the VFGMs, and storing the selections of fantasy athlete/participants made by the user and by the VFGMs, as respective teams in a team database on a computer; and
   using a database of real-world performances/statistics, for the athlete/participants in the database of real-world athlete/participants, from a particular time period and a set of fantasy game scoring rules, using the computer to calculate and determine the relative performance of the teams with respect to each other.

6. A method as recited in claim 5 further comprising permitting the user to select VFGMs against which to compete from a database of VFGMs.

7. A method as recited in claim 5 further comprising determining a winner from among the user and the selected VFGMs based on the relative performance of the teams.

8. A method as recited in claim 5 wherein the particular time period occurs after the draft is run.

9. A method as recited in claim 5 wherein the fantasy game scoring rules are determined before the draft is run.

10. A method for playing a single user fantasy game for a user, the method comprising:
   selecting VFGMs against which to compete from a database of VFGMs, each VFGM comprising a draft strategy stored on a computer and determined by one or more human remote general managers who are not the user;
   participating in a draft with selected VFGMs as other participants besides the user, wherein the user and the selected VFGMs make selections of fantasy athlete/participants from a database of real-world athlete/participants, according to predetermined draft rules, the VFGMs making selections by means of a computer making selection decisions according to the strategies that constitute the VFGMs;

storing the selections of fantasy athlete/participants made by the user and by the VFGMs, as respective teams in a team database on a computer; and using a database of real-world performances/statistics, for the athlete/participants in the database of real-world athlete/participants, from a particular time period and a set of fantasy game scoring rules, determining the relative performance of the teams with respect to each other.

11. A method as recited in claim 10 further comprising determining a winner from among the player and the selected VFGMs based on the relative performance of the teams.

12. A method as recited in claim 10 wherein the particular time period occurs after the draft is run.

13. A method as recited in claim 10 wherein the fantasy game scoring rules are determined before the draft is run.

* * * * *